US007779704B1

(12) United States Patent
Chu

(10) Patent No.: US 7,779,704 B1
(45) Date of Patent: Aug. 24, 2010

(54) ANTI-VIBRATION TORQUE SENSING AND CONTROL DEVICE FOR TOOLS

(76) Inventor: George Chu, No. 11-2, Sung-Kiang South Road, Chungli Industrial Park, Chungli, Taoyuan (TW)

(*) Notice: Subject to any disclaimer, the term of this patent is extended or adjusted under 35 U.S.C. 154(b) by 0 days.

(21) Appl. No.: 12/322,277

(22) Filed: Feb. 2, 2009

(51) Int. Cl.
*G01L 3/00* (2006.01)

(52) U.S. Cl. .................................................. 73/862.338

(58) Field of Classification Search ............. 73/862.338
See application file for complete search history.

(56) References Cited

U.S. PATENT DOCUMENTS

| | | | | |
|---|---|---|---|---|
| 5,404,775 | A * | 4/1995 | Abe | 81/469 |
| 6,196,071 | B1 * | 3/2001 | Shomo | 73/862.21 |
| 6,892,826 | B2 * | 5/2005 | Giardino | 173/1 |
| 7,036,407 | B2 * | 5/2006 | Pyre et al. | 81/467 |
| 7,188,549 | B2 * | 3/2007 | Ohtake et al. | 81/57.38 |
| 7,249,526 | B2 * | 7/2007 | Hsieh | 73/862.21 |
| 7,275,450 | B2 * | 10/2007 | Hirai et al. | 73/862.21 |
| 7,307,517 | B2 * | 12/2007 | Liu et al. | 340/441 |

* cited by examiner

*Primary Examiner*—Lisa M Caputo
*Assistant Examiner*—Freddie Kirkland, III

(57) ABSTRACT

A torque sensing and control device for tools comprises: a torque sensing and transmitting adapter fabricated with rib structure and mounted on or built in a fastening tool; at least a torque sensor secured on at least a rib evenly spaced and formed on the adapter and operatively sensing a torque signal when applying a torque on a work or object when rotatably operating the fastening tool; and a digital display control module operatively receiving the torque signal, displaying a torque data and generating an audio or visual warning signal for reminding the user for stopping operation of the fastening tool, or for switching off power or air supply to the fastening tool, and or actuating a delay control to restart a next fastening operation in a pre-determined time interval.

12 Claims, 6 Drawing Sheets

ANTI-VIBRATION TORQUE SENSING AND CONTROL DEVICE FOR TOOLS

BACKGROUND OF THE INVENTION

A conventional tool for fastening screws or bolts is not provided means for knowing an applying torque whether it is enough or not for tightly fastening the screws or bolts on a work piece. If the torque is not enough to fasten the screws or bolts, the work piece may be easily loosened due to vibration, thereby easily causing danger. If it is too tight, the screws or bolts may be destructed as subjected to undurable torque force (such as over the yield point thereof) to thereby damage the work piece instantly.

In order to sense a torque for a rotating member, U.S. Pat. No. 7,307,517 disclosed a wireless torque sensor which is located on the rotating member to generate signals indicative of a torque associated with the rotating member to sense the torque. Such a prior art comprises a torque sensing element configured upon a substrate in association with an antenna for sending and receiving wireless signals and adhered on the rotating member. However, when subjected to high-speed rotation of the rotating member, a great centrifugal force may easily release torque sensor from the rotating member, or under violent vibration especially when the bonding adhesive is aged and delaminated, thereby losing the sensing effect of the torque sensor.

The present inventor has found the drawbacks of the prior arts and invented the present anti-vibration torque sensing and control device for tools.

SUMMARY OF THE INVENTION

The object of the present invention is to provide a torque sensing and control device for tools comprising: a torque sensing and transmitting adapter mounted on or built in a fastening (or torque) tool; at least a torque sensor secured on at least a rib formed on the adapter and operatively sensing a torque signal when applying a torque on a work or object when the fastening tool is rotated; and a digital display control module operatively receiving the torque signal, displaying a torque data and generating an audio or visual warning signal for reminding the user for stopping operation of the fastening tool, or for switching off power or air supply to the fastening tool, and or actuating a delay control to delay a fastening operation in a pre-determined time interval until the next fastening operation.

DETAILED DESCRIPTION

The present invention comprises: a torque sensing and transmitting adapter 1 mounted on or built in a fastening (or torque) tool 2; and a digital display control module 3. The fastening tool 2 may be a pneumatic tool, an electric-operated tool or a hand-operated tool. The digital display control module 3 may be built in the tool 2, or may be externally connected to the tool 2, not limited in the present invention. The torque signal as sensed by the torque sensing and transmitting adapter 1 may be transmitted to the digital display control module 3 either by wire transmission or by wireless transmission.

As shown in FIGS. 1~5, the present invention comprises: a torque sensing and transmitting adapter 1 secured to or mounted on a pneumatic fastening tool 2, and a digital display control module 3.

Figure 1:
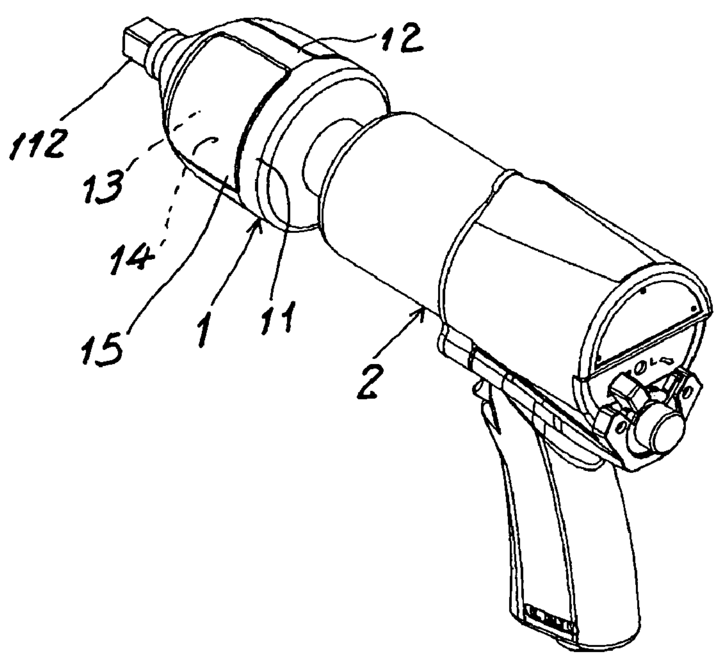
FIG. 1 is a perspective view of a first preferred embodiment of the present invention.
Figure 2:
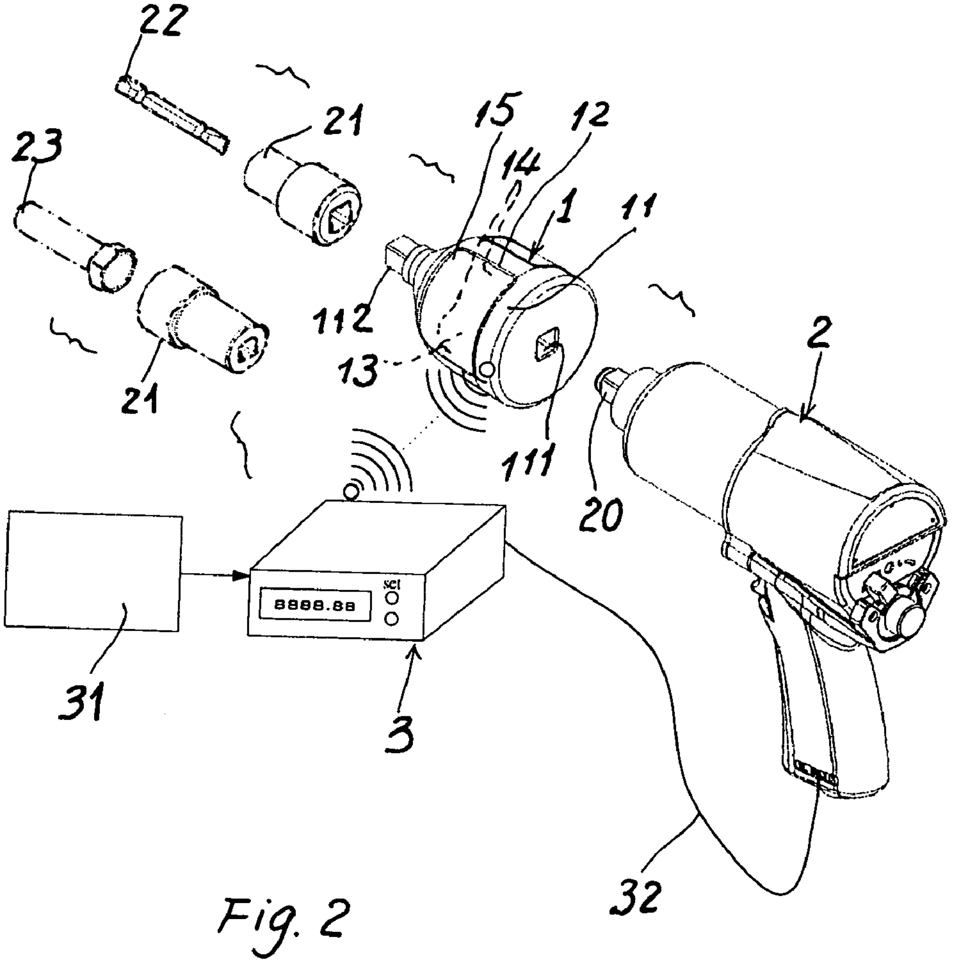
FIG. 2 is an exploded view of the present invention as shown in FIG. 1.
Figure 4:
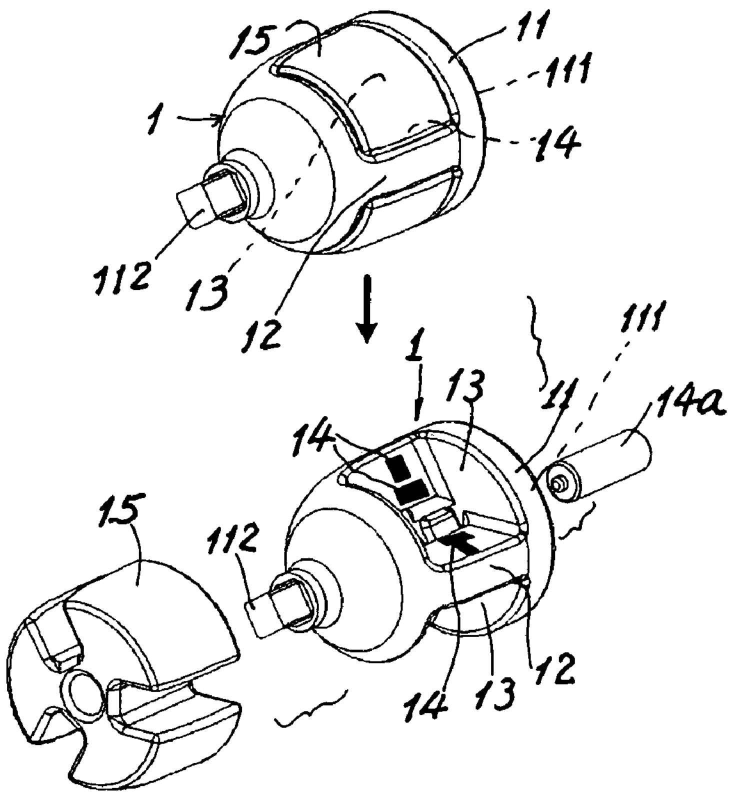
FIG. 4 shows another preferred torque sensing and transmitting adapter of the present invention.
Figure 3:
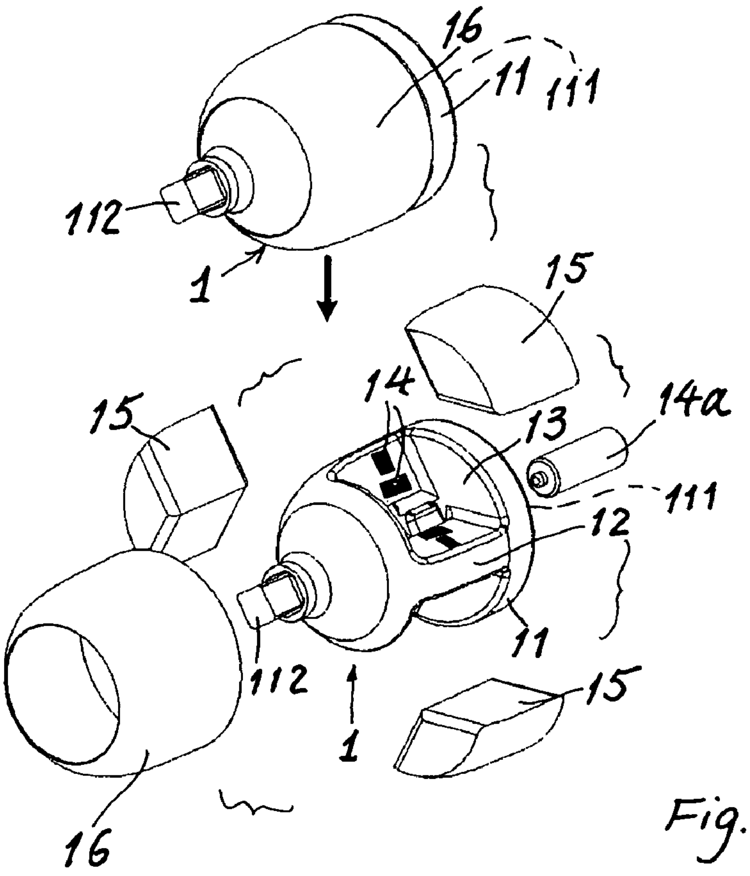
FIG. 3 is an expended view showing the torque sensing and transmitting adapter of the present invention.

The digital display control module 3 may be connected with a pneumatic power source 31 such as a compressed air source, and also connected to the fastening or torque tool 2 by a conduit or an air hose 32 as shown in FIG. 2, whereby when the torque as sensed reaches a pre-determined value, the control module 3 may shut down a valve (not shown) provided on the conduit 32 to stop the air supply.

The torque sensing and transmitting adapter 1 includes: a metallic body 11, a plurality of ribs 12 formed on the metallic body 11, a plurality of cavities 13 recessed in the metallic body 11 to define each rib 12 in between two neighboring cavities 13, at least a torque sensor 14 having a plurality of strain gauges formed on the ribs 12, and a plurality of anti-vibration means 15 such as made of shock-absorbing elastomers inserted, plugged, filled, bonded or molded into the cavities 13 for firmly fastening, holding, bonding or molding the torque sensor 14 including the strain gauges and their relevant electronic circuit elements in the cavities 13 to prevent from separation of the torque sensor 14 from the metallic body 11 due to adhesive aging or delamination, and serious violent vibration during tool operation.

The materials for making the anti-vibration means 15 should be selected from that will not retard or weaken the transmission of torque signals by the torque sensors 14.

A jacket member 16 may be provided for encasing the adapter 1 having the anti-vibration means 15 filled or inserted or molded in the cavities 13 (FIG. 3) for protecting the adapter 1 from being broken or damaged .

The body 11 of the adapter 1 is formed a recessed hole 111 at the rear adapter portion for coupling a driving shaft 20 of the tool 2, and an output shaft 112 (or a female connector) formed at the front portion of the adapter for connecting a socket 21 which is coupled to a driver bit 22 or a bolt 23 (or nut) as shown in FIG. 2.

The torque sensor 14 includes: at least one strain gauge secured on one rib 12 by adhesive or by other joining methods for sensing a torque signal corresponding to a deformation of the rib when subjected to a torque as effected by a rotating motor shaft 20 of the fastening tool 2; an amplifier for amplifying the torque signal as sensed by the strain gauges; a logic algorithm for logically computing a strain value of the toque signal for obtaining a corresponding torque value; an input means for inputting a relationship between the torque value and the strain value into a memory module (after assembly and upon calibration of the sensor); and a transmitter for transmitting the torque value to the digital display control module 3 by wire transmission or by wireless transmission; and wherein the memory module is provided for memorizing a relationship between the torque value and the strain value.

The torque sensor 14 further includes a power source supply 14*a* for powering the torque sensor 14, including: a rechargeable battery, a replaceable battery, a utility power supply connected externally, or a power generating device built in the adapter 1.

The number of the strain gauges and torque sensors of the present invention are not limited, and may be adjustably varied according to the precision requirement for measuring the torque.

The digital display control module 3 includes: a display for displaying a torque value as pre-set or as finally measured; a set of push buttons for pre-setting a desired torque value; a receiver for receiving an output torque signal as transmitted by the torque sensor 14 by wire transmission or by wireless transmission; and a logic control module for controlling an actuation of a power source or pneumatic (air) source, whereby upon a comparison of a torque value as transmitted and measured from the torque sensor 14 with a pre-set torque value in the digital display control module 3 until obtaining an equal torque value, the control module will produce an audio or visual warning signal to remind the user to stop a fastening operation of the fastening tool, or to shut off an air (or power) supply by switching off an air valve or a solenoid valve (by closing an air valve) to the fastening tool 2, or to actuate/start a delay control to delay the fastening operation in a predetermined time interval until the next fastening operation.

Figure 5:
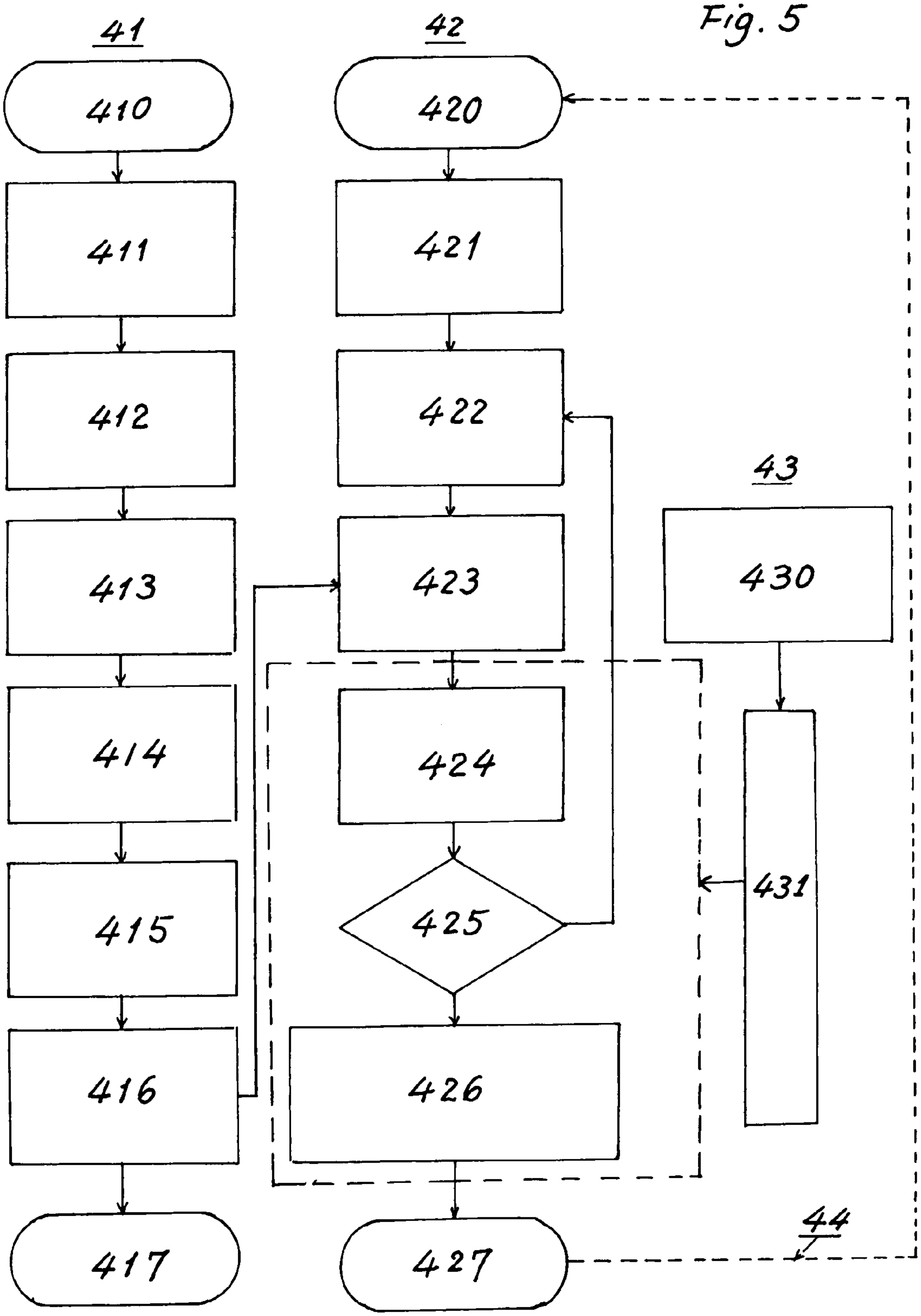
FIG. 5 shows a control process flow chart in accordance with the present invention.

As shown in FIG. 5, a process flow chart is disclosed for showing the logic operation and control process flow in accordance with the present invention, in which the numerals in FIG. 5 are explained and indicated as follows (Note: The left process steps indicate a calibration process, while the right process steps indicating the operation process):

A. Calibration Process (41):

410 . . . Starting the calibration;

411 . . . Driving the adapter 1 by the fastening tool 2;

412 . . . Strain produced on the strain gauge of the torque sensor;

413 . . . Logic operation by the logic algorithm to obtain strain value $\epsilon$;

414 . . . Input the relationship between torque T and strain value $\epsilon$;

415 . . . Calculating the torque T with the mathematic formula:

$$T=K\epsilon+C,$$

wherein K, C is respectively a constant;

416 . . . Memorizing the mathematic formula:

$$T=K\epsilon+C$$

into a memory module; and

417 . . . Ending the calibration.

B. Process Operation of the Adapter (42):

420 . . . Starting the torque sensing and transmitting adapter 1;

421 . . . Actuating the adapter 1 by the fastening tool 2;

422 . . . Logic operation by the logic algorithm to obtain the strain value $\epsilon'$;

423 . . . Finding a corresponding torque value T' through a calibrated formula:

$$T'=K\epsilon'+C$$

by using the memory module;

424 . . . Displaying a torque value T' by the control module;

425 . . . Comparing and determining T'=T" by the control module;

426 . . . Producing warning signal, or switching off the power source, and or re-starting the power source in a pre-determined time interval; and

427 . . . Ending.

C. Input of the desired/pre-set torque value T" (43):

430 . . . Input the desired torque T"; and

431 . . . Control the digital display control module.

D. Delay Control (44):

A delay control may be provided for switching off the fastening operation in a pre-set time interval when reaching the preset torque value. Afterwards, the fastening operation will be re-started, e.g., after the pre-set several seconds.

The present invention is superior to the prior arts with the following advantages:

1. The strain gauges of the torque sensors 14 are firmly fastened or bonded by the anti-vibration means 15 to prevent from their releasing from the adapter 1 to increase the operation reliability and prolong the service life. This is because the strain gauge is mounted on the rib 12, especially on a side wall of a cavity 13 contiguous to the rib 12, and will be "integrally formed" together with the anti-vibration means 15 for resisting violent vibration.
2. The strain gauge is mounted on the rib to greatly increase its sensitivity for sensing a slight deformation when subjected to a rotational torque applying force.
3. Once the anti-vibration means or shock absorber 15 is filled, bonded or molded into the cavity 13, the electronic elements and circuit of the torque sensor 14 will be integrally formed with the anti-vibration means or shock absorber 15 to "interlock" the sensor parts for increasing their resistance to the vibrational shock, thereby preventing damage of the present invention and preventing from any unexpected intermittent fastening operation of the tool 2.

Figure 6:
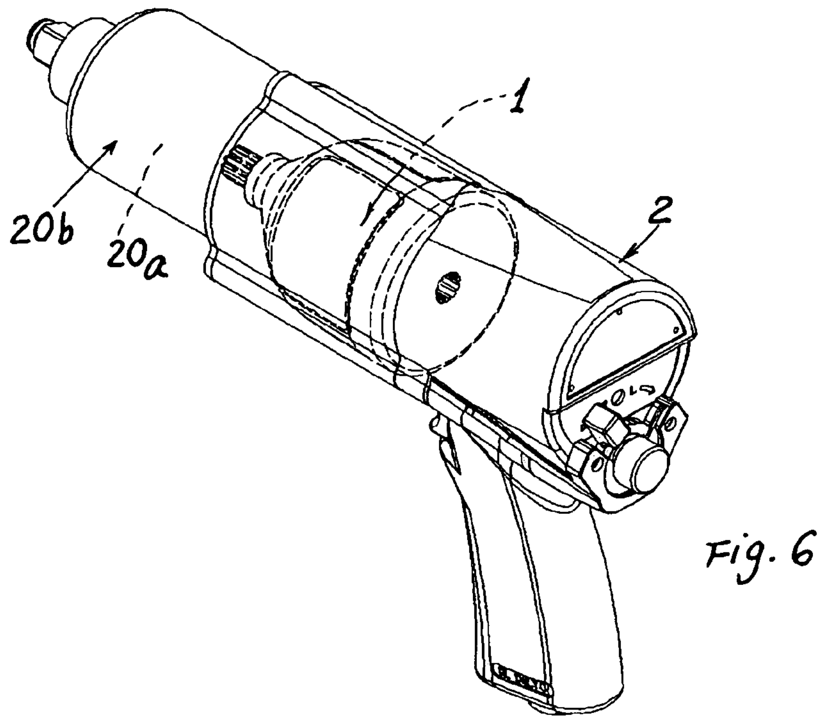
FIG. 6 shows a second preferred embodiment of the present invention.
Figure 7:
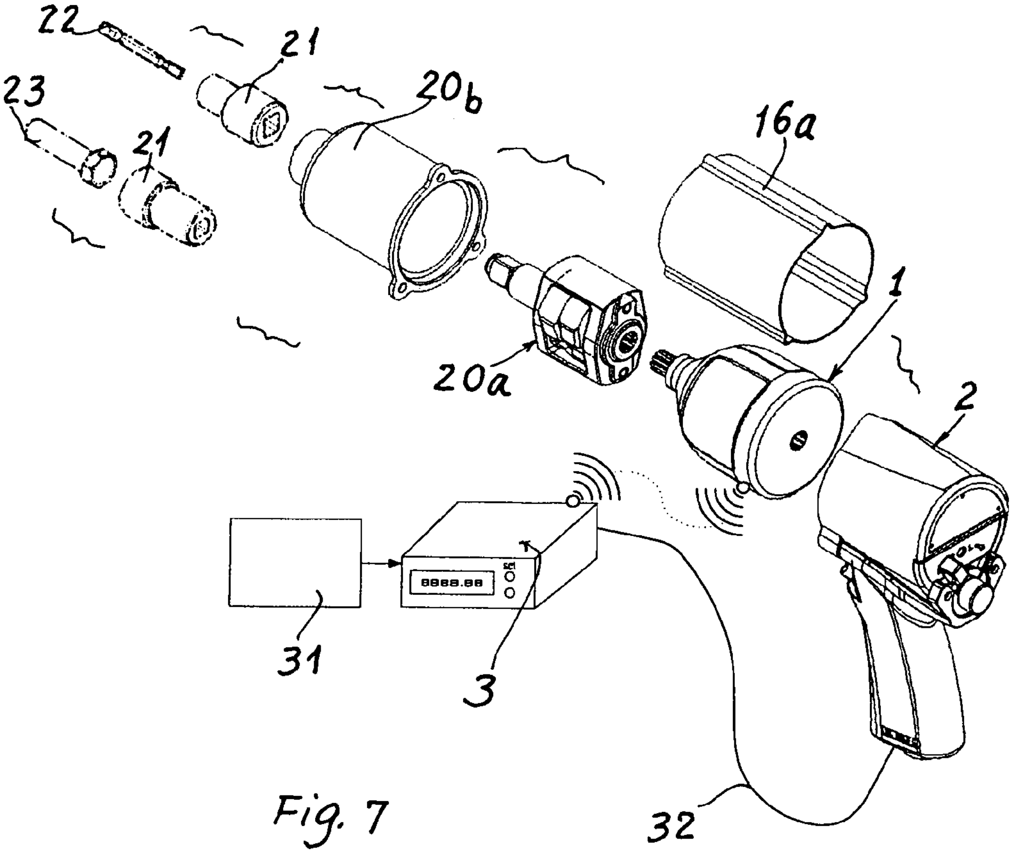
FIG. 7 is an exploded view showing the embodiment as shown in FIG. 6.

As shown in FIGS. 6 and 7, another preferred embodiment of the present invention discloses a torque sensing or transmitting adapter 1 which is built in the fastening tool 2. By the way, the adapter 1 may be further protected by a shell 16*a*, which is made of materials causing no interference to the transmission of the torque signal as transmitted by the present invention. Then, the adapter 1 is connected to a pneumatic impact mechanism (or ram means) 20*a* which is further covered by a front cover 20*b*.

Figure 8:
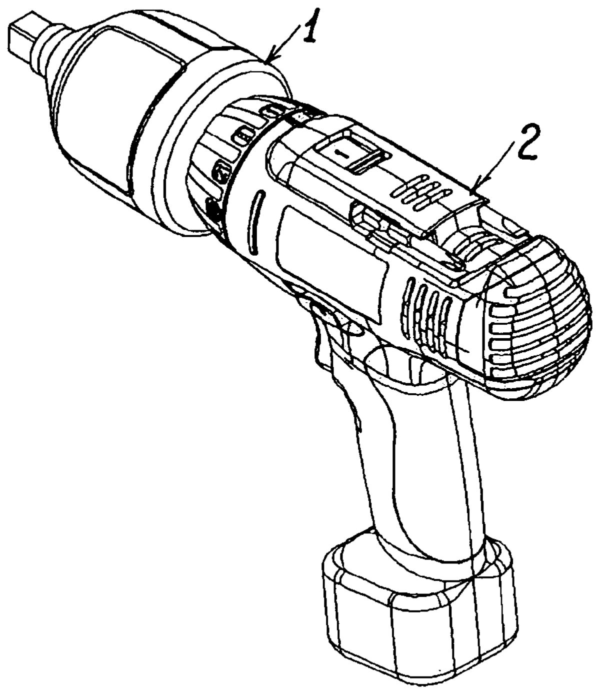
FIG. 8 shows a third preferred embodiment of the present invention.
Figure 9:
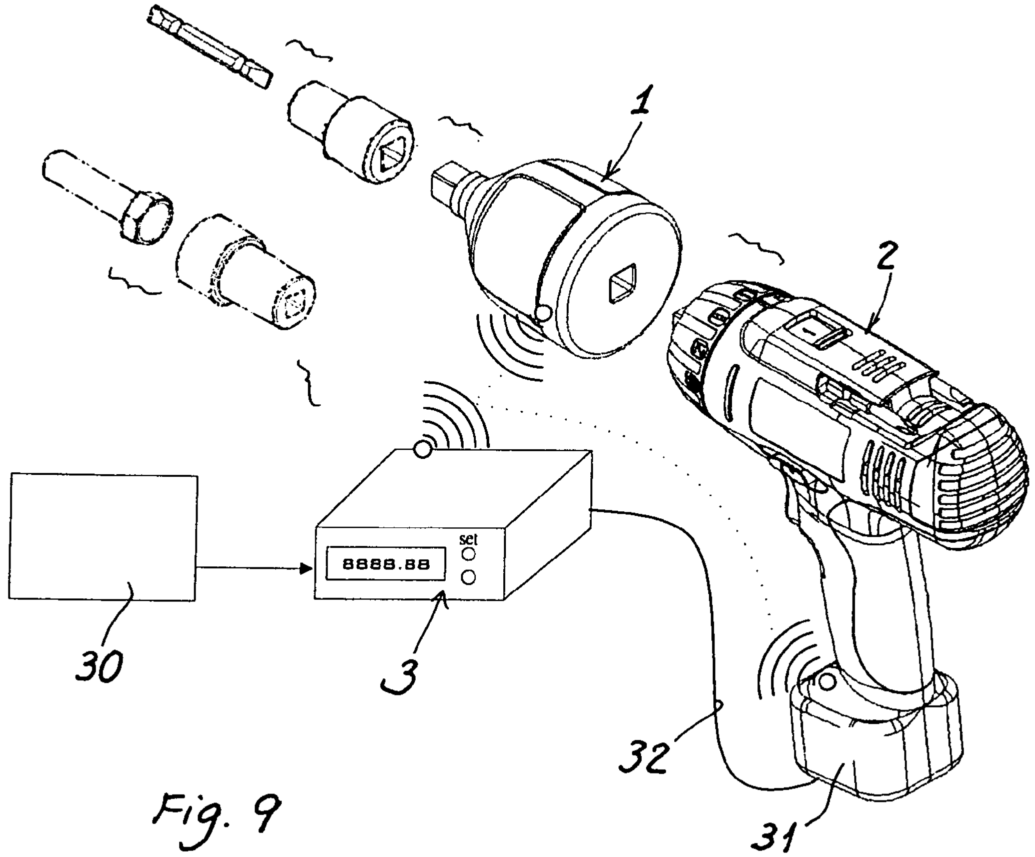
FIG. 9 is an exploded view of the embodiment as shown in FIG. 8.

As shown in FIGS. 8 and 9, an electric (rechargeable) fastening tool 2 is disclosed and is electrically driven by an electric power source 31 which may be a battery (FIG. 9) and upon transmitting of a control signal through the wire 32 between the control module 3 and the power source 31 (or by wireless control), the fastener tool 2 may be switched on or off conveniently. Numeral 30 indicates a utility power source.

If the electric tool 2 is powered by an externally connected power source, a solenoid valve (not shown) may be provided in the wire 32 for switching off the external power supplied to the tool 2 by actuating such a solenoid valve.

Figure 10:
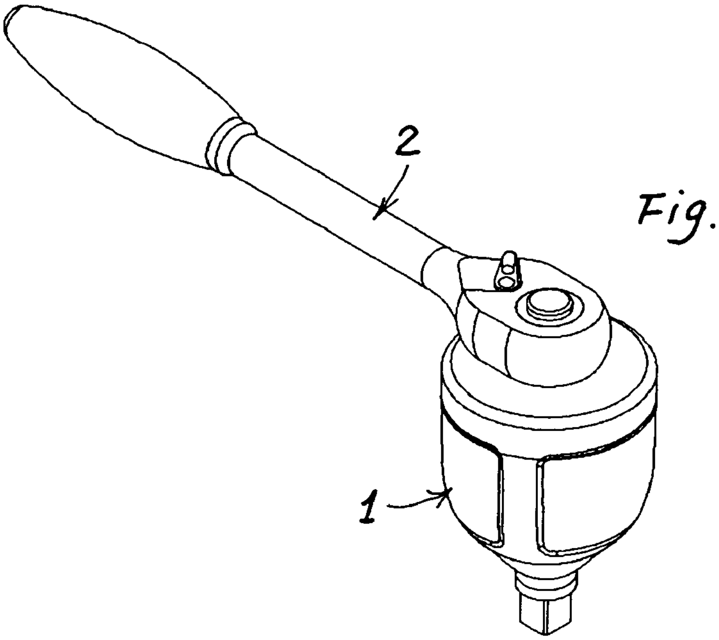
FIG. 10 shows a fourth preferred embodiment of the present invention.
Figure 11:
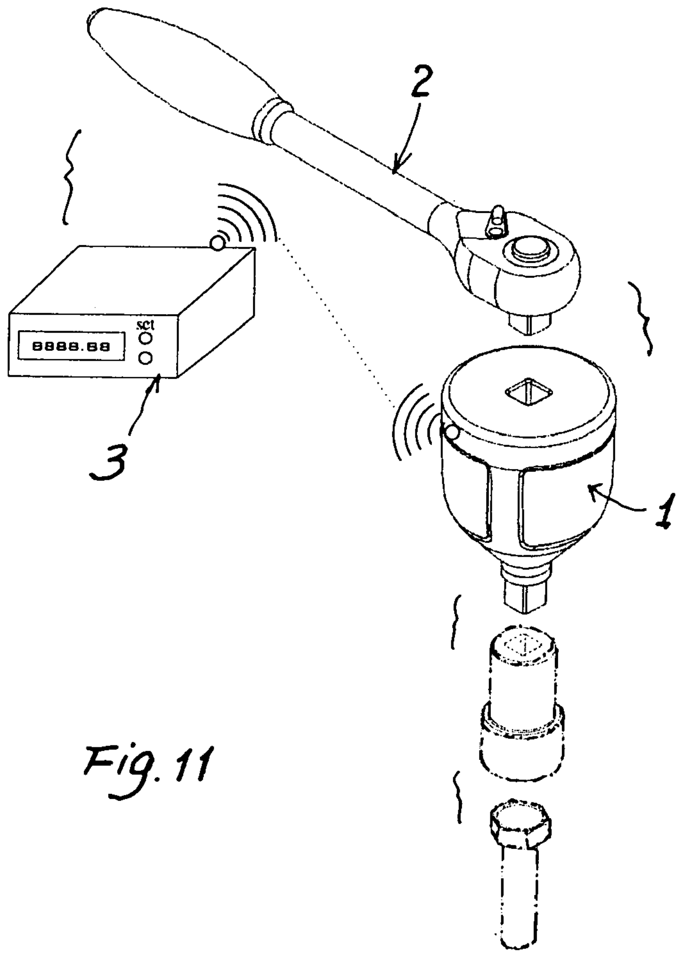
FIG. 11 is an exploded view of the embodiment as shown in FIG. 10.

In FIGS. 10 and 11, a hand-operated tool 2 is disclosed to be connected with the adapter 1 of the present invention, and be controlled by the control module 3.

The present invention may be further modified without departing from the spirit and scope of the present invention.

The ribs 12 are preferably formed in the adapter 1 in an evenly-spaced arrangement for a dynamic balance during rotation of the tool shaft 20.

I claim:

1. A torque sensing and control device for tools comprising:

a torque sensing and transmitting adapter mounted on or built in a fastening tool; at least a torque sensor secured on at least a rib formed on the adapter and operatively sensing a torque signal when applying a torque on a work or object when rotatably operating the fastening tool; and a digital display control module operatively receiving the torque signal, displaying a torque data and generating an audio or visual warning signal for reminding a user for stopping operation of the fastening tool, or for switching off power or air supply to the fastening tool and/or actuating a delay control to re-start a fastening operation in a pre-determined time interval; and wherein said torque sensing and transmitting adapter includes: a metallic body, a plurality of said ribs formed on the metallic body, a plurality of cavities recessed in the metallic body to define each said rib in between two neighboring cavities, one said torque sensor having at least one strain gauge formed on one said rib, and a plurality of anti-vibration means made of materials without retarding or weakening the transmission of torque signal, and said anti-vibration means inserted, plugged, filled, bonded or molded into the cavities for firmly fastening, holding, bonding or molding the torque sensor including the strain gauge and an electronic circuit of said sensor in the cavities to prevent from separation of the torque sensor from the metallic body.

2. A device according to claim 1, wherein the materials for making the anti-vibration means is selected from a shock-absorbing elastomer which will not retard or weaken a transmission of torque signals by the torque sensor.

3. A device according to claim 1, wherein said adapter further includes a jacket member for encasing the adapter having the anti-vibration means filled or inserted in the cavities for protecting the adapter from being broken or damaged.

4. A device according to claim 1, wherein said metallic body of the adapter is formed a recessed hole in a rear adapter portion for coupling a driving shaft of the fastening tool, and an output shaft or connector formed on a front adapter portion for connecting a socket for coupling a driver bit, a bolt or a nut for driving the same.

5. A device according to claim 1, wherein said torque sensor includes: at least one strain gauge secured on one said rib of said adapter for sensing a torque signal corresponding to a deformation of the rib when subjected to a torque when rotating a shaft of the fastening tool; an amplifier for amplifying the torque signal as sensed by the strain gauge; a logic algorithm for logically computing a strain value of the toque signal for obtaining a corresponding torque value; an input means for inputting a relationship between the torque value and the strain value, after assembly and upon calibration of the sensor, into a memory module; said memory module operatively memorizing the relationship between the torque value and the strain value; and a transmitter for transmitting the torque value to the digital display control module by wire transmission or by wireless transmission.

6. A device according to claim 5, wherein torque sensor further includes a power supply source for powering the torque sensor, including: a rechargeable battery, a replaceable battery, a utility power supply connected externally, or a power generating device built in the adapter.

7. A device according to claim 5, wherein said strain gauge of said torque sensor is secured on a cavity wall of a cavity contiguous to one said rib, having an anti-vibration means inserted, filled or molded into said cavity for integrally forming said strain gauge, a plurality of electronic elements of said sensor and said anti-vibration means in said adapter.

8. A device according to claim 1, wherein said digital display control module includes: a display for displaying a torque value as pre-set or as finally measured; a set of push buttons for pre-setting a torque value; a receiver for receiving an output torque signal as transmitted from the torque sensor by wire transmission or by wireless transmission; and a logic control module for controlling an actuation of a power source or pneumatic source, whereby upon a comparison of a torque value as transmitted and measured from the torque sensor with a pre-set torque value in the digital display control module to reach an equal torque value, the control module will produce an audio or visual warning signal to remind the user to stop a fastening operation of the fastening tool, or to switch off an air or power supply to the fastening tool, or to start a delay control to re-start a next fastening operation in a predetermined time interval.

9. A device according to claim 8, wherein said control module is externally connected to said fastening tool; or said control module being built in said fastening tool.

10. A device according to claim 1, wherein said adapter further includes a jacket member for protectively covering said anti-vibration means, said sensor and a plurality of electronic elements connected to said sensor as formed in said cavities.

11. A device according to claim 1, wherein said adapter further includes a shell for protecting said adapter when built in said fastening tool, said shell made of materials having no interference to the transmission of torque signal from said torque sensor.

12. A device according to claim 1, wherein said ribs are formed in said metallic body as evenly spaced for a dynamic balance when rotating a shaft of the fastening torque tool.

* * * * *